United States Patent
Larsen et al.

(10) Patent No.: US 10,282,368 B2
(45) Date of Patent: May 7, 2019

(54) GROUPED CATEGORIZATION OF INTERNET CONTENT

(71) Applicant: Symantec Corporation, Mountain View, CA (US)

(72) Inventors: Christian Earnest Larsen, Orem, UT (US); David Francis Meyer, Spanish Fork, UT (US); Jonathan Jeremiah Dinerstein, Draper, UT (US)

(73) Assignee: Symantec Corporation, Mountain View, CA (US)

( * ) Notice: Subject to any disclaimer, the term of this patent is extended or adjusted under 35 U.S.C. 154(b) by 368 days.

(21) Appl. No.: 15/223,782

(22) Filed: Jul. 29, 2016

(65) Prior Publication Data

US 2018/0032599 A1   Feb. 1, 2018

(51) Int. Cl.
*G06F 16/00* (2019.01)
*G06F 16/28* (2019.01)
*H04L 29/06* (2006.01)
*G06N 20/00* (2019.01)

(52) U.S. Cl.
CPC ........... *G06F 16/285* (2019.01); *G06N 20/00* (2019.01); *H04L 63/20* (2013.01)

(58) Field of Classification Search
CPC .......................... G06F 17/30598; G06F 16/285
USPC .................................................. 707/737, 748
See application file for complete search history.

(56) References Cited

U.S. PATENT DOCUMENTS

| | | | | |
|---|---|---|---|---|
| 7,085,753 B2 * | 8/2006 | Weiss | ..................... | G06F 16/951 707/710 |
| 8,078,625 B1 * | 12/2011 | Zhang | ................... | G06F 16/954 707/748 |
| 2003/0225763 A1 * | 12/2003 | Guilak | .................. | G06F 16/353 |
| 2010/0121790 A1 * | 5/2010 | Klinkott | ................ | G06F 16/954 706/12 |

* cited by examiner

*Primary Examiner* — Chelcie L Daye
(74) *Attorney, Agent, or Firm* — Holland & Hart LLP

(57) ABSTRACT

In one embodiment, a device in a network classifies Internet content data using one or more classifiers to identify a plurality of content classes for the content data. Each content class has a corresponding classification score based on the classification. The device determines whether any of the classification scores exceed a threshold level. The device identifies a set of content groups, where each of the plurality of content classes is associated with one of the content groups. The device associates the content data with a selected one of the content groups based on a determination that the classification scores for the plurality of content classes do not exceed the threshold level.

20 Claims, 9 Drawing Sheets

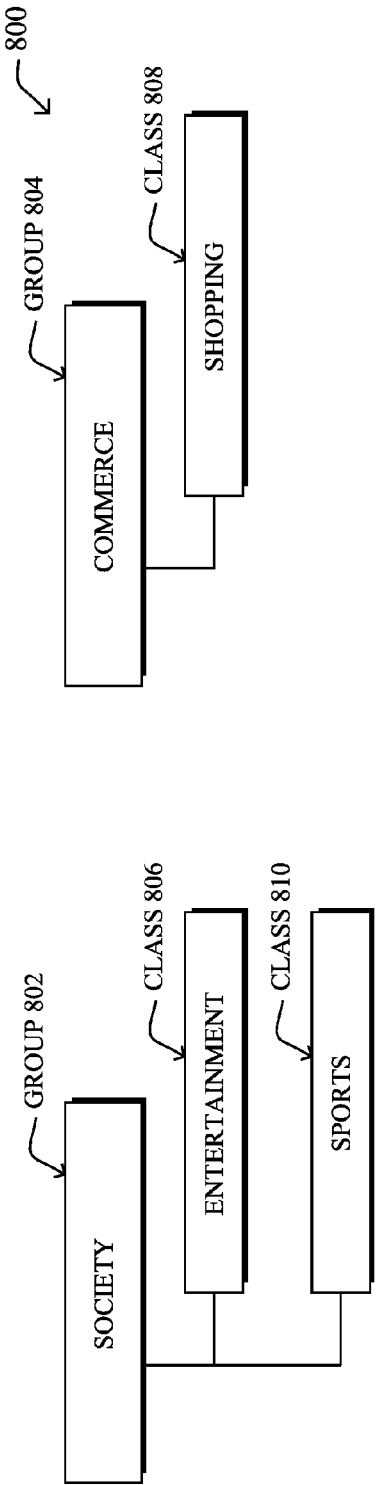
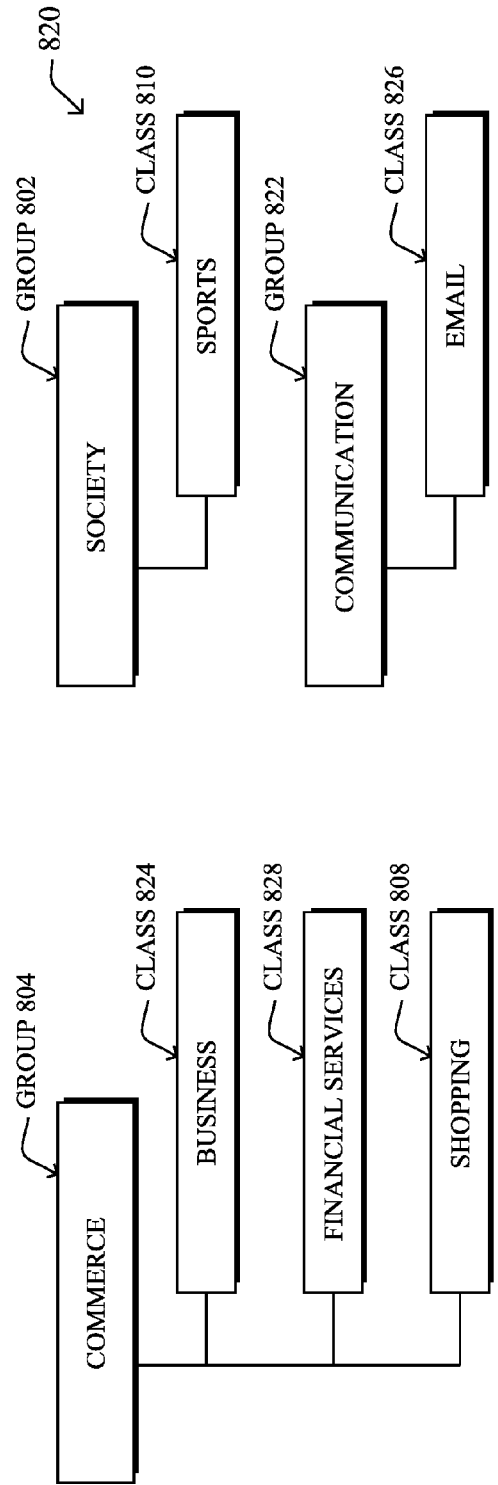
FIG. 8A
FIG. 8B

GROUPED CATEGORIZATION OF INTERNET CONTENT

TECHNICAL FIELD

The present disclosure relates generally to computer networks and, more particularly, to systems and methods for the grouped categorization of Internet content.

BACKGROUND

Internet security has become a critical focus of businesses, governments, schools, and other entities. A core goal of Internet security has always been the detection and/or prevention of network attacks. However, in recent years, the focus of Internet security has expanded rapidly to also encompass a number of other analytic functions. For example, another aspect of Internet security now focuses on preventing the leak of sensitive data, such as credit card information, Social Security numbers, medical records, trade secrets, and the like. In another example, another Internet security function now focuses on preventing users from accessing certain applications or content (e.g., pornography, gambling websites, etc.), based on user policies.

As the role of Internet security has expanded, so too has the set of potential input features for analysis by the security system. Notably, while certain features, such as traffic signatures, are still used for purposes of detecting network attacks, this information does little for purposes of ensuring data security, enforcing user access policies, and performing other Internet security functions. In addition to new types of input features, certain Internet security functions may also leverage input features of different degrees of granularity, meaning that some security functions may require more specific information than others.

SUMMARY

According to some embodiments herein, a method is disclosed. The method includes classifying, by a device in a network, Internet content data using one or more classifiers to identify a plurality of content classes for the content data. Each content class has a corresponding classification score based on the classification. The method also includes determining, by the device, whether any of the classification scores exceed a threshold level. The method additionally includes identifying, by the device, a set of content groups, where each of the plurality of content classes is associated with one of the content groups. The method further includes assigning, by the device, the content data with a selected one of the content groups based on a determination that the classification scores for the plurality of content classes do not exceed the threshold level.

In further embodiments, an apparatus is disclosed. The apparatus includes one or more network interfaces to communicate with a network. The apparatus also includes a processor coupled to the network interfaces and configured to execute one or more processes. The apparatus further includes a memory configured to store a process executable by the processor. When executed, the process is operable to classify Internet content data using one or more classifiers to identify a plurality of content classes for the content data. Each content class has a corresponding classification score based on the classification. The process when executed is also operable to determine whether any of the classification scores exceed a threshold level. The process when executed is additionally operable to identify a set of content groups, where each of the plurality of content classes is associated with one of the content groups. The process when executed is additionally operable to assign the content data with a selected one of the content groups based on a determination that the classification scores for the plurality of content classes do not exceed the threshold level.

In additional embodiments, a tangible, non-transitory, computer-readable media is disclosed having software encoded thereon that causes a device in a network to execute a process. When executed, the process is operable to classify Internet content data using one or more classifiers to identify a plurality of content classes for the content data. Each content class has a corresponding classification score based on the classification. The process when executed is also operable to determine whether any of the classification scores exceed a threshold level. The process when executed is additionally operable to identify a set of content groups, where each of the plurality of content classes is associated with one of the content groups. The process when executed is additionally operable to assign the content data with a selected one of the content groups based on a determination that the classification scores for the plurality of content classes do not exceed the threshold level.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8B illustrate examples of the assignment of content data to a content group.

Figure 1A:
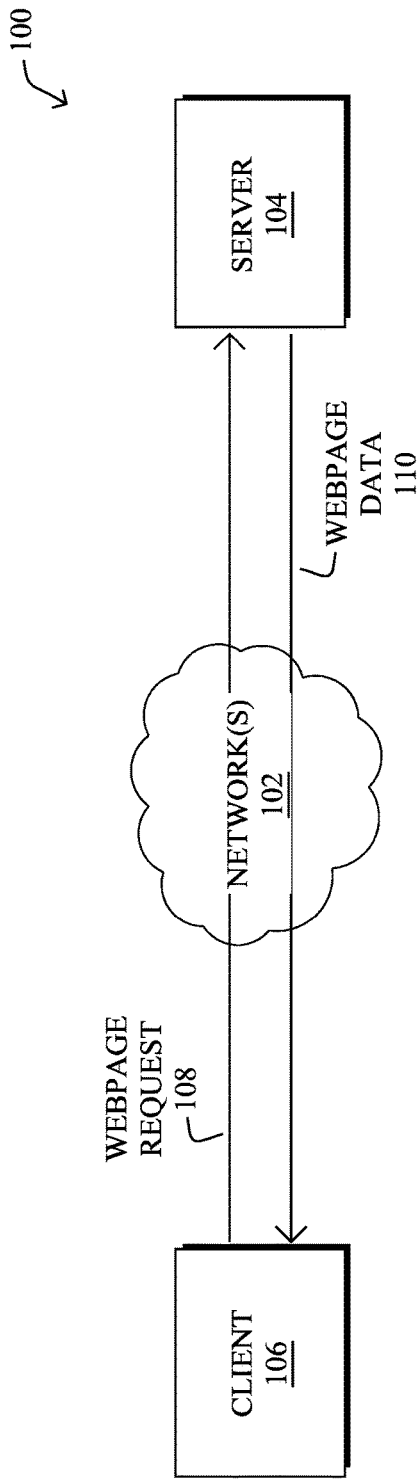
FIGS. 1A-1B illustrate an example computing system, according to various embodiments.

In the figures, reference numbers refer to the same or equivalent parts of the present invention throughout the several figures of the drawing.

DESCRIPTION OF EXAMPLE EMBODIMENTS

According to the techniques described herein, systems and methods are disclosed that allow for the grouped categorization of Internet content data. This information can be used, for example, to enhance the functions of an Internet security service, such as a content blocking/filtering service. In certain aspects, the techniques herein first attempt to associate a specific content class to the content data, if the classification score for the class is above a threshold level. However, if none of the classes exceed the threshold, the techniques further provide mechanisms to assign a more generic content group to the content data based on the resulting classes from the classification.

FIG. 1A illustrates an example computer system 100, according to various embodiments. As shown, a client device 106 may be in communication with a webpage server 104 via one or more computer networks 102. As will be appreciated, network(s) 102 may include, but are not limited to, local area networks (LANs), wide area networks (WANs), the Internet, cellular networks, infrared networks, satellite networks, or any other form of data network configured to convey data between computing devices.

Networks 102 may include any number of wired or wireless links between client device 106 and server 104. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, combinations thereof, or the like. Example wireless links may include, but are not limited to, near field-based links, WiFi links, satellite links, cellular links, infrared links, combinations thereof, or the like.

Server 104 may be of any form of computing device operable to provide remote services to one or more client devices, such as client device 106. For example, server 104 may be a rack-based server, a desktop-based server, a blade server, or the like. In some embodiments, server 104 may be part of a data center in which multiple servers are hosted. In further embodiments, server 104 may be part of a cloud computing environment.

Client device 106 may be of any form of electronic device operable to communicate via network(s) 102. For example, client device 106 may be a desktop computer, a laptop computer, a tablet device, a smartphone, a wearable electronic device (e.g., a smart watch, a head up display, etc.), a smart television, a set-top device for a television, etc.

In general, client device 106 may be operable to receive webpage or other Internet content data and render the received content data on an electronic display. For example, device 106 may execute a browser application that, when executed by device 106, is configured to request webpage data. In various embodiments, the browser application may be a stand-alone web browser or, alternatively, another form of application that is operable to render and display webpage data (e.g., a mobile application, etc.).

As shown, the browser application of client device 106 may send a webpage request 108 to server 104, to request certain webpage data. For example, the browser application may execute a HyperText Transfer Protocol (HTTP) GET command, to retrieve webpage data from server 104. Client device 106 may address request 108 to an Internet Protocol (IP) address or another form of network locator for server 104. In some cases, client device 106 may determine the address of server 104 by first performing a lookup of a Universal Resource Locator (URL), e.g., using a domain name system (DNS).

In response to receiving request 108, server 104 may retrieve the corresponding webpage data 110 and send webpage data 110 back to client device 106. As would be appreciated, webpage data 110 may include webpage code that the browser application of client device 106 may use to render the requested webpage. For example, webpage data 110 may include HyperText Markup Language (HTML) code, Extensible Markup Language (XML) code, or the like. In some embodiments, webpage data 110 may also include code written in a scripting language such as JavaScript or the like. Further, webpage data 110 may include, in some cases, multimedia files (e.g., images, video, audio, etc.) or other files to support the rendering of the webpage on client device 106.

Client device 106 may repeat the above process any number of times with any number of different servers, depending on the contents of webpage data 110. For example, if webpage data 110 includes an HTML image tag, client device 106 may send a separate request for the image to the location indicated by the tag. Similarly, webpage data 110 may cause client device 106 to request additional scripting files, multimedia files, HTML files, etc.

Figure 1B:
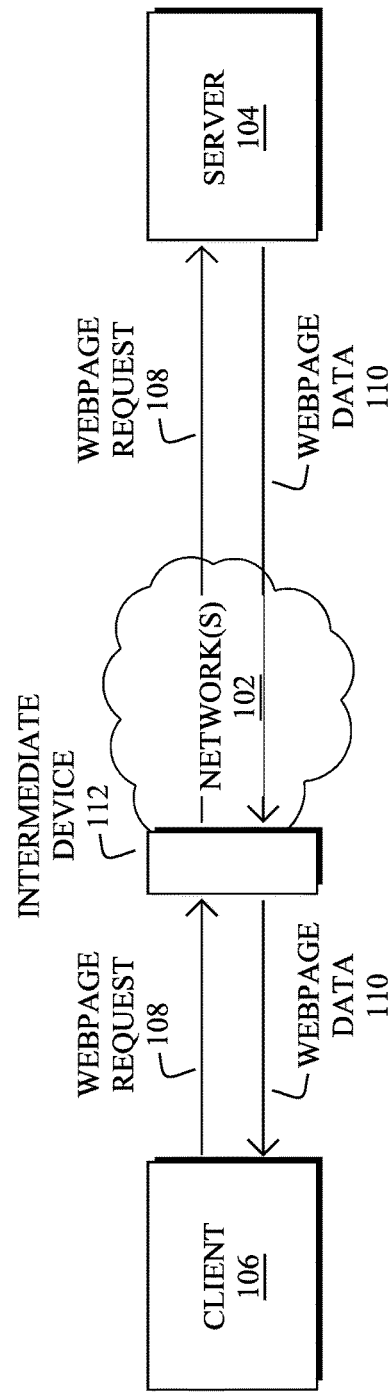

Referring now to FIG. 1B, computer system 100 may also include an intermediate device 112, according to various embodiments. In general, intermediate device 112 may be any intermediary device (e.g., router, firewall, stand-alone device, etc.) between client device 106 and server 104 in system 100. For example, in some embodiments, intermediate device 112 may be associated with the gateway of the LAN in which client device 106 is located. In other embodiments, intermediate device 112 may be another intermediary device located within network(s) 102 through which traffic associated with client device 106 flows. For example, in one embodiment, intermediate device 112 may be part of a cloud-based service that performs security-related functions on the traffic.

As shown, webpage request 108 sent by client device 106 to server 104 may, in some cases, pass through intermediate device 112 (e.g., either directly or rerouted to intermediate device 112 for analysis). In turn, intermediate device 112 may forward request 108 on to server 104. In response to receiving webpage request 108, server 104 may then send webpage data 110 back through intermediate device 112 for display by the browser application of client device 106. In further embodiments, intermediate device 112 may also act as a proxy device to intercept and decrypt encrypted traffic between client device 106 and server 104, such as Internet traffic that uses Transport Layer Security (TLS).

While intermediate device 112 is shown in FIG. 1B intercepting webpage data, this is merely one possible implementation. In further implementations, intermediate device 112 may intercept and assess document for download to client device 106, such as a portable document format (PDF) file or the like, text-based communications, etc.

In various embodiments, intermediate device 112 may be part of an Internet security service, or in communication therewith, to perform security-related functions on the exchanged traffic 108-110. In some embodiments, such a service may assess the content of webpage data 110 and/or a reputation score for server 104, to enforce a security or user policy in response to webpage request 108. For example, assume that server 104 is suspected of distributing malware. In such a case, when intermediate device 112 receives webpage request 108, it may determine that server 104 is a security threat and deny the request (e.g., by not forwarding request 108 on to server 104 and notifying client 106 of the denial).

In a similar manner to above, intermediate device 112 may enforce a user policy based on the content of webpage data 110, which can be pre-fetched for analysis or fetched on the fly in response to webpage request 108. For example, assume that the content of the webpage is of the type that an employer wishes to block (e.g., gambling, pornography, etc.). In such a case, the security service may, based on the webpage content, employ a similar blocking mechanism as above, to prevent the user of client device 106 from accessing the prohibited content.

Regardless of the security functions that the security system performs, classifying the content of webpage data 110 available from server 104 may be a core aspect of these functions. Notably, the security system (e.g., intermediate device 112 or another device in communication therewith) may analyze the content of webpage data 110 using textual and/or image recognition, to extract the content data for analysis. For example, the system may determine a term frequency-inverse document frequency (tf-idf) for the words present on the webpage, to weight different terms in the text based on how often the words/terms are used. In turn, the system may attempt to categorize/classify the content to apply the various security rules. For example, if the webpage frequently includes terms related to baseball, the system may classify/categorize the content as being in the "Sports" category.

Figure 2:
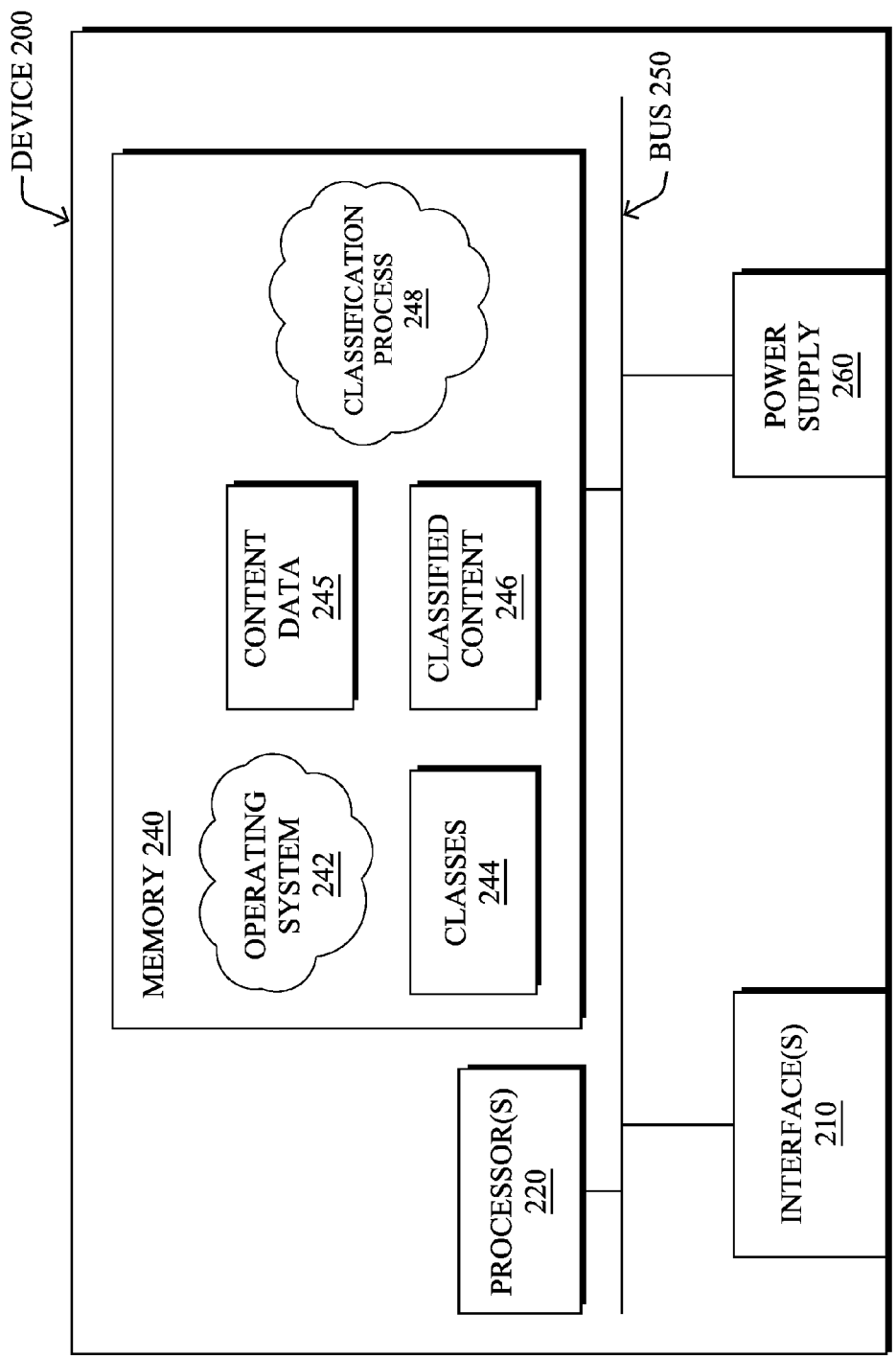
FIG. 2 illustrates an example processing circuit, according to various embodiments.

Referring now to FIG. 2, a schematic block diagram of an example processing circuit 200 that may be used with one or more embodiments described herein, e.g., as part of intermediate device 112 or another device in communication therewith that is configured to perform the specific functions described herein. As shown, processing circuit 200 may comprise one or more network interfaces 210 (e.g., wired, wireless, etc.), at least one processor 220, and a memory 240 interconnected by a system bus 250 and powered by a power supply 260.

The network interface(s) 210 contain the mechanical, electrical, and signaling circuitry for communicating data with other computing devices in system 100 (e.g., via network(s) 102. The network interfaces may be configured to transmit and/or receive data using a variety of different communication protocols. Note, further, that processing circuit 200 may have two different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 243-245, which may include any or all of: a set of content classes 244, content data 245, and/or classified content. An operating system 242, portions of which are typically resident in memory 240 and executed by processor 220, functionally organizes the device by, inter alia, invoking operations in support of software processes and/or services executing on the device. These software processes and/or services may comprise, in various embodiments, a classification process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
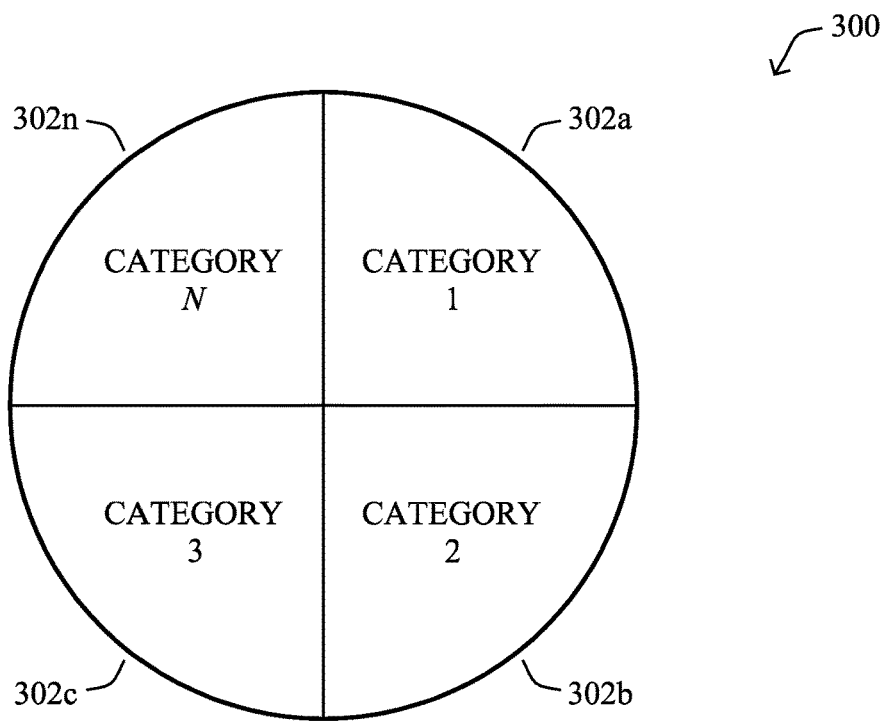
FIG. 3 illustrates an example of classification categories.

Referring now to FIG. 3, example classification categories 300 are shown. In particular, Internet content data may be categorized/classified into any number of categories 302a-302n (e.g., a first through $n^{th}$ category). Such categories may, for example, be user defined as needed or, alternatively, predefined or preset according to the security system. Generally, the classification device (e.g., a device equipped with processing circuit 200) may use these classifications to assess the content data. Example categories 302a-302n may include, but are not limited to, "Finance," "Commerce," "Sports," "Politics," "News," "Adult," etc. As would be appreciated, categories 302a-302n may also include very broad categories or very granular categories, as desired (e.g., "Sports" versus "Golf").

Figure 4:
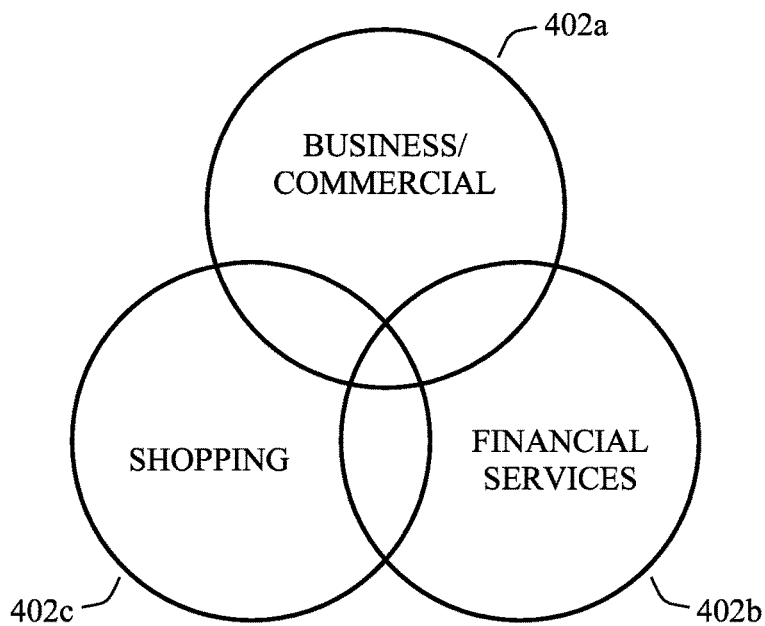
FIG. 4 illustrates an example of overlapping classification categories.

FIG. 4 depicts an example illustration 400 showing overlapping classification categories 402a-402c. Since the content classification is a function of the content itself (e.g., text, images, etc.), it is entirely possible for some classification categories to overlap. For example, as shown, a "Business/Commercial" category 402a may partially overlap a "Financial Services" category 402b and a "Shopping" category 402c. Similarly, categories 402b-402c may also partially overlap.

In the context of performing content classification, overlapping classes/categories can prove challenging. Notably, the input information for the classifier (e.g., the corpus and/or images of a webpage, email, etc.) may fall within multiple classes or have a low corresponding classification score as a result of the classification (e.g., a measure of how well the resulting classification label matches the input data). For example, if a clustering approach is taken to classify the content data, each class may have a centroid and the classification score may be a measure of the distance between the input dataset and the centroid of the assigned class. If the distance is relatively large, the classification score may be low, indicating a weak match to the class.

Figure 5:
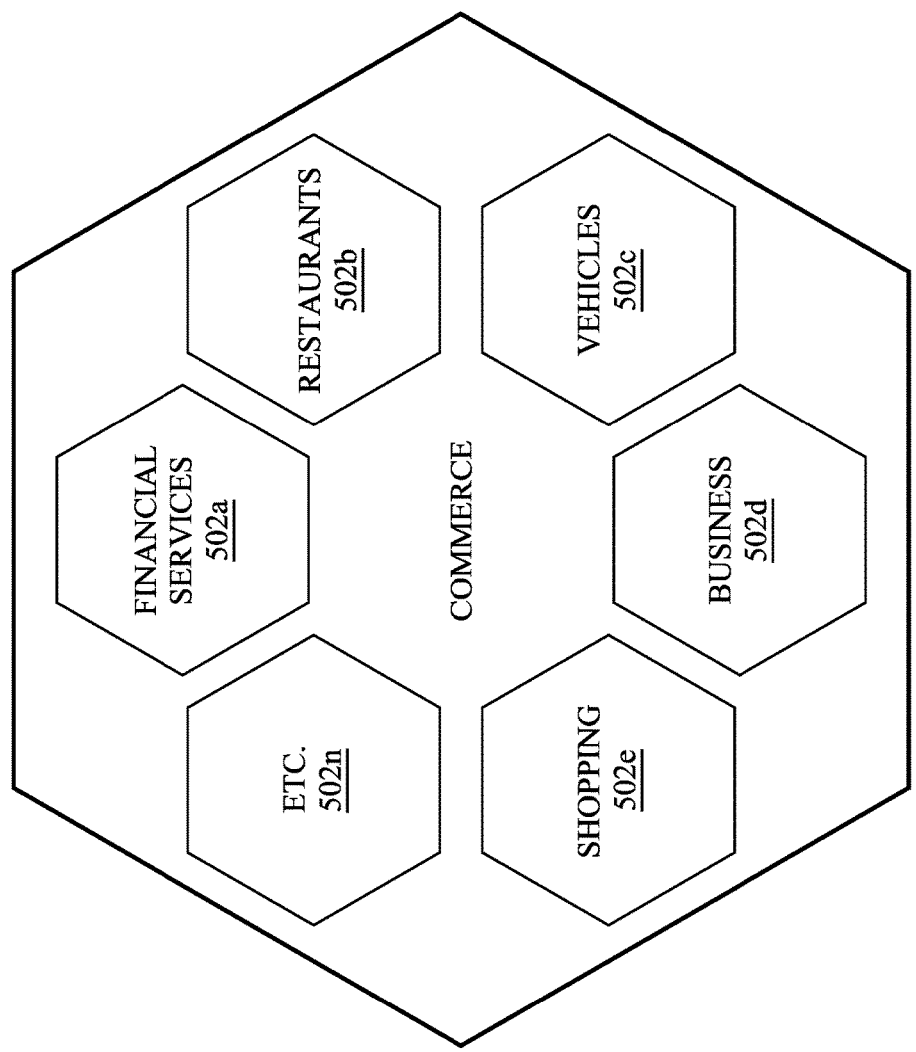
FIG. 5 illustrates an example content group.

Referring now to FIG. 5, an example content group 500 is shown, according to various embodiments. As noted previously, classes may be of differing degrees of granularity. Thus, in some embodiments, the system may take a hierarchical approach to classification. In particular, a "content group," as used herein, generally refers to a class/label that encompasses a set of more granular classes. In other words, a content group is its own class/category that is more generic than its constituent classes (e.g., the "Adult" content group may include the underlying class "Pornography").

In the example shown, consider the case in which there are classes 502a-502n (e.g., a first through $n^{th}$ class) to which the content data may belong. Particularly, the content may belong to the "Financial Services" class 502a, the "Restaurants" class 502b, the "Vehicles" class 502c, the "Business" class 502d, the "Shopping" class 502e, etc. Centrally, however, each of these classes may belong to a more generic class, "Commerce," represented by content group 500.

In accordance with various embodiments, the techniques herein propose a mechanism that accounts for potential uncertainty with respect to the classification of Internet content data. Notably, if the content data is weakly associated with a particular one of classes 502a-502n, such as "Financial Services" class 502a (e.g., due to overlap with another class 502), the system may opt instead to apply the "Commerce" class/label from content group 500 to the Internet content data. In doing so, the classification system can convey useful information with reduced specificity to the security system with less risk of incorrect categorization/classification. Particularly, the techniques herein address situations in which there is insufficient content for a high-confidence categorization, insufficient evidence to justify a "strong" category, noise in the data, mixed feedback in the form of site submissions, and other conditions that may affect the reliability of the content classification.

Figure 6:
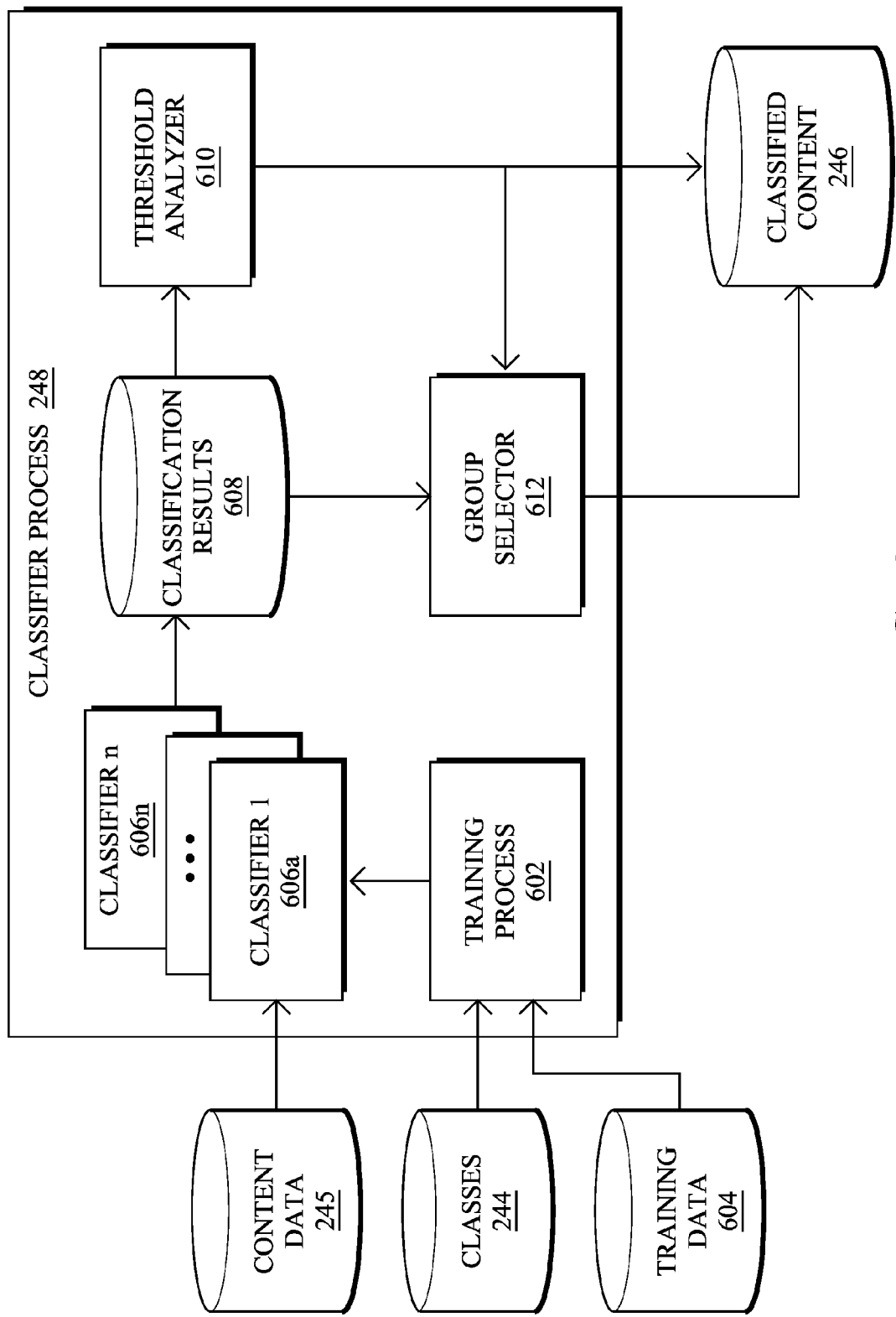
FIG. 6 illustrates an example architecture for classifying Internet content.

Referring now to FIG. 6, an example architecture 600 is shown for classifying Internet content, in accordance with various embodiments herein. As shown, classifier process 248 may include a number of sub-processes that operate in conjunction to classify content data 245.

Classifier process 248 may include any number of classifiers 606a-606n (e.g., a first through $n^{th}$ classifier) configured to classify content data 245, such as webpage data available from a website, email data, text message data, or the like. In some embodiments, classifier(s) 606 may use a machine learning approach, to classify content data 245. For example, classifier(s) 606 may use supervised learning to apply a classification label to captured content data 245. Generally, supervised learning entails building a model using a set of pre-labeled training data (e.g., examples of each class to be applied). Then, in turn, content data 245 is compared to the model, to assess which of the classes is most applicable to the content. Example supervised approaches include, but are not limited to, Bayesian classifiers, statistical classifiers (e.g., binary classifiers, multi-class classifiers, etc.), support vector machines and other linear classifiers, and the like. In further embodiments, classifier(s) 606 may use an unsupervised learning approach, such as clustering, to classify content data 245.

As noted, in some instances, classifier(s) 606 may be trained using a set of pre-labeled/pre-classified examples. Accordingly, in some embodiments, classifier process 248 may include a training process 602 configured to generate classifier(s) 606. In general, training process 602 may take as input the desired set of classes 244 and a set of training data 606 that includes examples of classes 244. For example, the security system may include a feedback mechanism whereby a user may label a particular website as belonging to a given class (e.g., the user flags a given website as being "Pornography," etc.). In turn, training process 602 may use the pre-labeled data in training data 604 to construct the classification models for classifier(s) 606. In further embodiments, training process 602 may be executed separately from that of classifier process 248, either on the same device or on a remote device, and may provide pre-trained classifiers 606 to classifier process 248.

In response to a new set of content data 245, classifier(s) 606 may attempt to apply any number of classes/classification labels to the content (e.g., classes 244). For example, if binary classifiers are used, one classifier 606 may attempt to label the content as either related to "Shopping" or "Not Shopping." Based on the analysis of content data 245, classifier(s) 606 may generate classification results 608 that may include the applied classes/labels and potentially classification scores for each of the applied classes/labels.

Generally, the classification scores in classification results 608 serve to represent the degree of confidence/reliability in the class applied to content data 245. For example, in the case of a linear classifier 606, such a classification score may be a linear predictor function of the form:

$$\text{Score}(X_i, \beta_k X_i)$$

where $X_i$ is the $i^{th}$ feature vector (e.g., the $i^{th}$ set of inputs for classifier(s) 606 and $\beta_k$ is a weighting vector for the $k^{th}$ class. Any other suitable classification score may be used, in other implementations, depending on the classification techniques used by classifier(s) 606.

In various embodiments, classifier process 248 may include a threshold analyzer 610 that compares the classification scores in classification results 608 to any number of predefined thresholds. More specifically, threshold analyzer 610 may determine whether any of the classes applied to content data 245 in classification results 608 are above a threshold measure of reliability. In other words, threshold analyzer 610 may determine whether the top-scored class in classification results 608 is above a threshold and, if so, apply this class to content data 245 and output the association as part of classified content 246, accordingly.

If threshold analyzer 610 determines that the top class for content data 245 is not above a threshold degree of reliability, threshold analyzer 610 may send an indication of this determination to group selector 612. Generally, group selector 612 is configured to associate a content group to sets of content data 245 when the top classification from classifier(s) 606 is below a threshold degree of reliability. As noted previously with respect to FIG. 5, a content group may be more general than that of the applied classes and may itself be a class that encompasses any number of the applied classes. For example, if threshold analyzer 610 determines that none of the more specific classes in classification results 608 are suitably reliable, group selector 612 may instead apply a more generic classification group to the analyzed set of content data 245 and output the results as classified content 246.

Once classifier process 248 has determined a class for content data 245 (e.g., either a class assigned by classifiers 606 or a content group assigned by group selector 612), classifier process 248 may send the output classified content 246 for additional processing. For example, classifier process 248 may send classified content 246 to a security service that uses the applied class in classified content 246 to block Internet traffic associated with the content (e.g., based on a user policy, security assessment, etc.).

Figure 7:
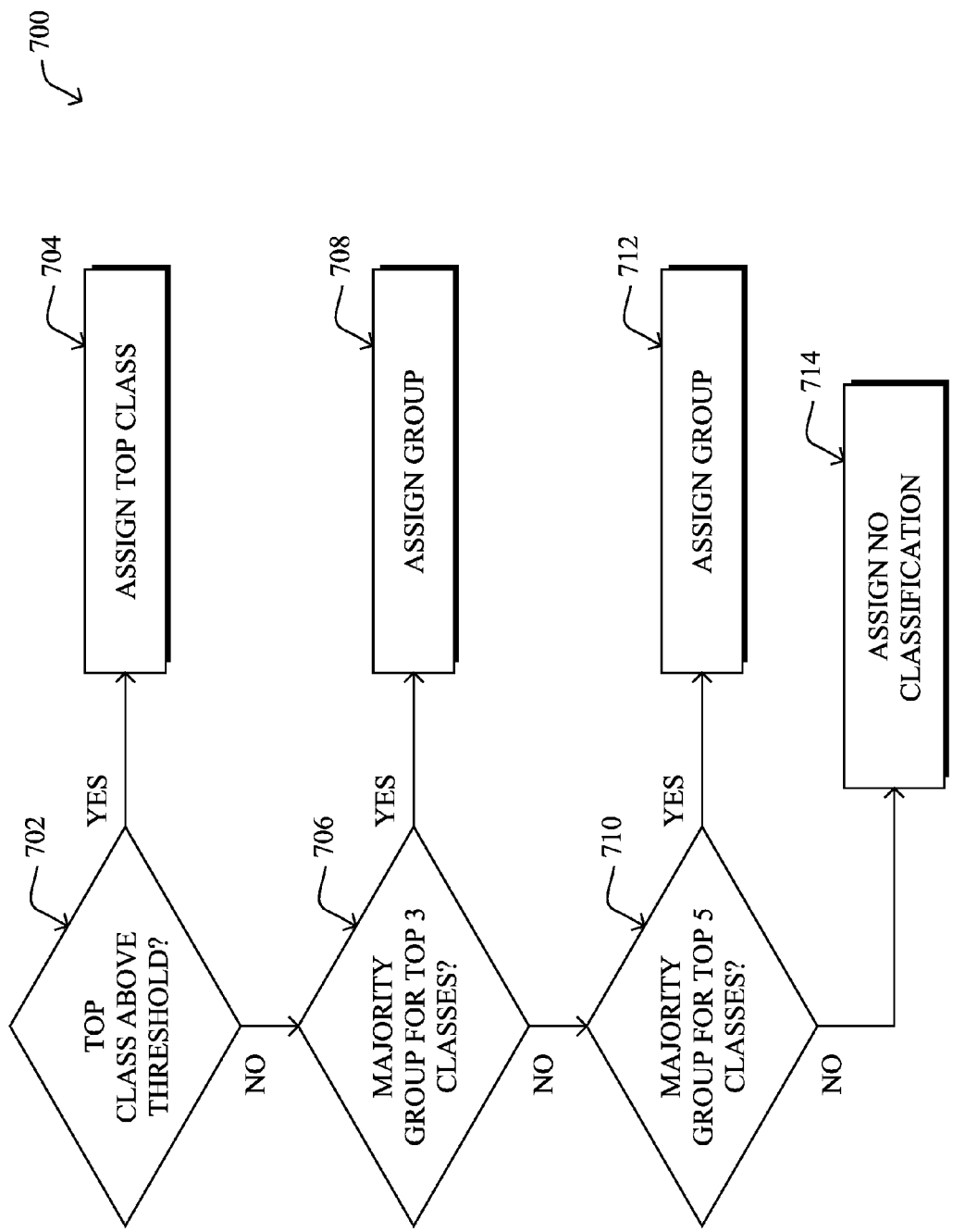
FIG. 7 illustrates an example processing diagram for classifying content using content groups.

Referring now to FIG. 7, an example processing diagram 700 is shown for classifying content using content groups. In some embodiments, classifier process 248 may use the process shown, to assess the classification results of classifier(s) 606.

In an initial processing block 702, classifier process 248 may determine whether the classification score for the top class assigned by classifier(s) 606 is above a threshold value (e.g., using threshold analyzer 610). If so, the process may continue on to block 704 where classifier process 248 assigns the top class to the content data. However, if all of the classes from classifier(s) 606 are below the threshold, processing may instead continue on to block 706.

In processing block 706, classifier process 248 may determine whether a majority of the top three classes in classification results 608 are associated with a particular content group (e.g., using group selector 612). If so, processing may continue to block 708 where classifier process 248 assigns the content group of the majority to content data 245. However, if no such majority exists, processing may instead continue on to processing block 710.

An example 800 of the analysis in processing block 706 is shown in FIG. 8A. Assume, for example, that classifiers 606 have applied the following classes/labels to content data 245: an "Entertainment" class 806, a "Shopping" class 808, and a "Sports" class 810, and that classes 806-810 have the three highest classification scores in classification results 608. However, assume also that none of classes 806-810 have a classification score above the required threshold to assign that class to the content data. Further, assume that classes 806 and 810 both belong to the "Society" content group 802 and that class 808 belongs to the "Commerce" content group 810. In such a case, since two of the top three classes (i.e., a majority of the three) belong to the same content group 802, classifier process 248 may assign the "Society" content group 802 to the content data, instead, thereby classifying the content as being Society-related. In other words, content group 802 may be selected as the winning group because the majority of possible classes/labels agree.

Referring again to FIG. 7, if a majority of the top three classes in processing block 706 do not belong to the same content group (e.g., each of the top three classes belong to different content groups), classifier process 248 may try again with a larger set of classes. For example, in processing block 710, classifier process 248 may reassess whether the majority of the top five classes, based on their classification scores, belong to the same content group. If so, processing may continue on to processing block 712 and classifier process 248 may assign the content group of the majority to the content data. However, if there is no majority, processing may instead continue on to processing block 714.

An example 820 of the analysis of processing block 710 is shown in FIG. 8B. As shown, assume that the top five classes, based on their classification scores, are the classes 808-810, described previously, and classes 824-828. Classes 824-828 include a "Business" class 824, an "Email" class 826, and a "Financial Services" class 828. Also, assume that none of classes 808-810 and 824-828 have classification scores above the requisite threshold to assign any of these classes as the final classification for the content data. Further, assume that classes 808, 824, and 828 belong to the "Commerce" content group 804, that class 810 belongs to the "Society" content group 802, and that class 826 belongs to the "Communication" content group 822. Since three of the five classes (i.e., a majority) belong to content group 804, classifier process 248 may associate content group 804 with the content data as the final classification. Said differently, if classifier process 248 uses a majority-based mechanism, it may assign content group 804 to the content, since the majority of the top five classes for the content belong to content group 804.

Referring again to FIG. 7, if a final class/content group is not assigned to the content data in blocks 704, 708, or 712, classifier process 248 may assign the content data to no classification. More specifically, if group selector 612 does not find a content group for a majority of the top classes, group selector 612 may instead assign an "Unassigned" class/label to the content data.

As would be appreciated, while the techniques herein describe selecting a content group based on a majority of the top three or top five classes, these embodiments are exemplary only and the top n-number of classes can be selected for analysis, as desired (e.g., a majority of the top seven classes, the top nine classes, etc.). Further, while the examples in FIG. 7 illustrate assessing whether there is a majority for two different sets of classes, this process may be repeated any number of times in other implementations (e.g., by looking at the top three classes, then the top five, then the top seven, etc.).

In addition, while the techniques herein describe selecting a content group based on the group comprising a majority of the top classes, other selection techniques may be used instead. For example, some embodiments provide for assessing whether a consensus exists among the top n-number of classes (e.g., whether the top n classes all belong to the same content group). Doing so may provide an intermediate level of reliability between selecting a particular class, if the class has a high enough classification score, or selecting a content group based on a majority.

Figure 9:
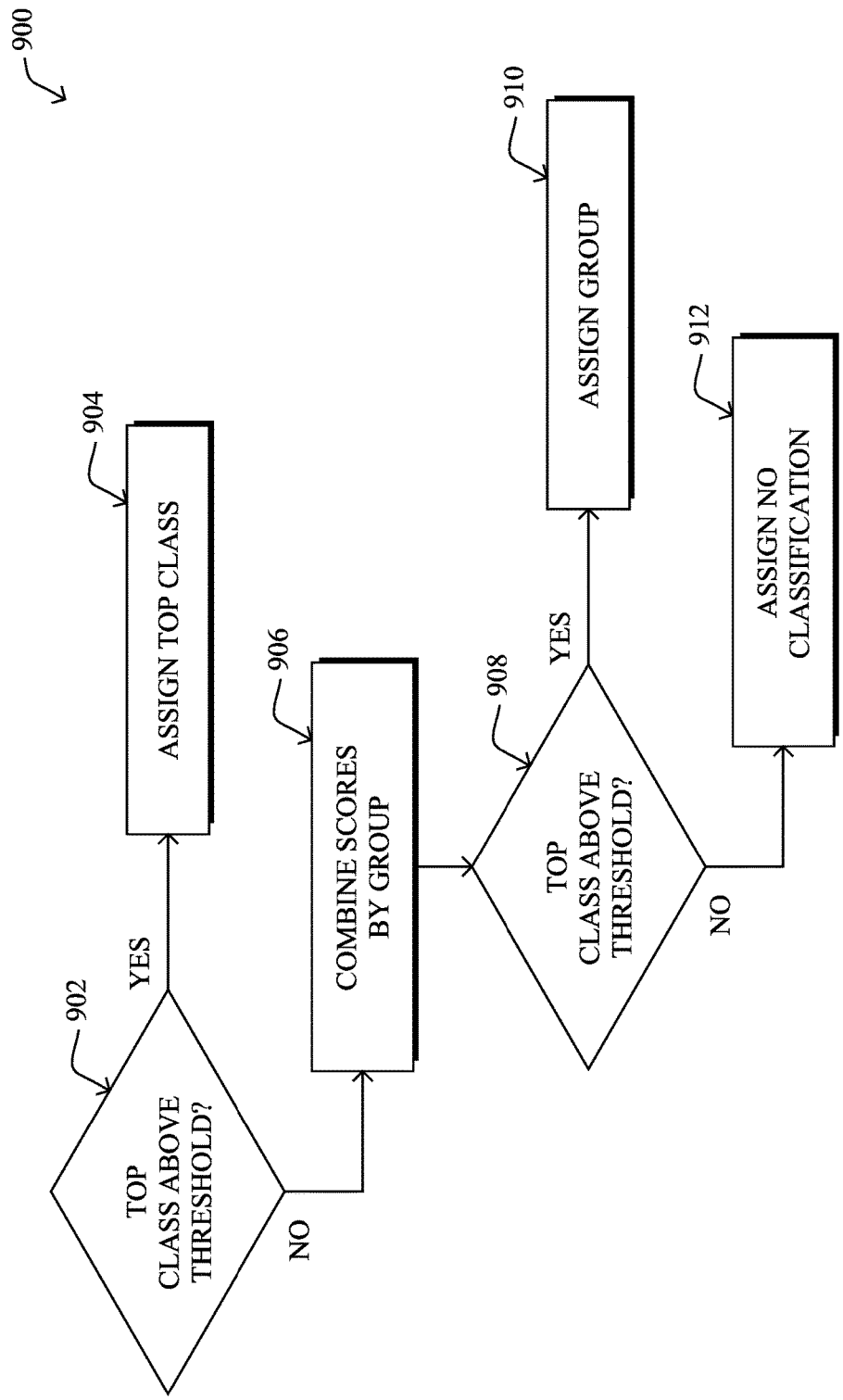
FIG. 9 illustrates an example processing diagram for using classification scores to assign content data to a content group.

FIG. 9 illustrates an example processing diagram 900 for using classification scores to assign content data to a content group. Generally, processing diagram 900 presents yet another approach that classifier process 248 may take to assign a class or content group to content data 245. As shown in processing blocks 902-904, classifier process 248 may take a similar approach to that in FIG. 7 by first determining whether the highest scored class from classifier(s) 606 is above a threshold (block 902) and, if so, assigning this class to the content data as the final classification (block 904). If not, however, processing may continue instead to processing block 906 for further analysis.

In some embodiments, as represented by processing block 906, group selector 612 may combine the scores for each of the classes in classification results 608, to determine a combined score for each of their associated content groups. For example, assume that n-number of classes in classification results 608 belong to the $j^{th}$ content group. In one example, the score for the $j^{th}$ content group may be calculated as follows:

$$\text{Group\_Score}_j = \sum_{i=1}^{n} \text{Class\_Score}_{i,j}$$

where $\text{Class\_Score}_{i,j}$ is the classification score for the $i^{th}$ class in classification results 608 that belongs to the $j^{th}$ content group. Other combined scores can be computed as desired, in other embodiments (e.g., by applying certain weights to the scores, time functions to the scores, etc.).

In processing block 908, classifier process 248 may determine whether the content group having the highest combined group score is above a predefined threshold. If so, processing may continue to block 910 and that content group is assigned to the content data as the final classification. However, if none of the content groups have a combined score above the threshold, processing continues to block 912 where classifier process 248 may assign no classification to the content data, similar to block 714.

Figure 10:
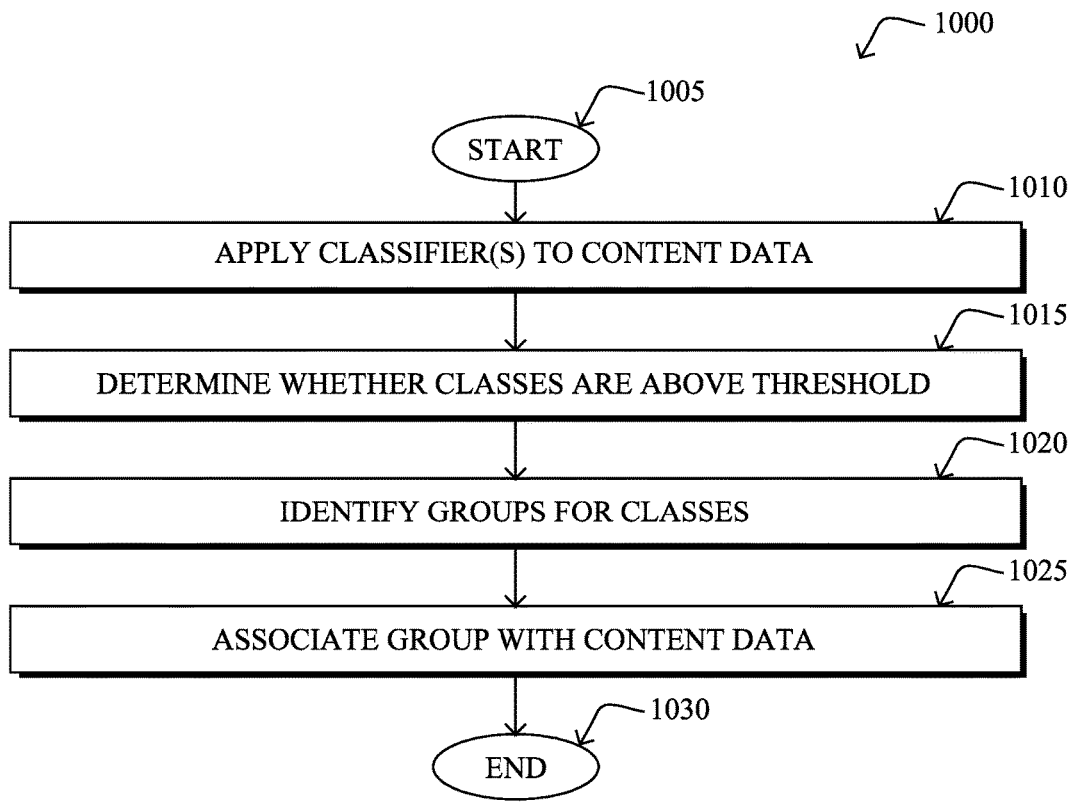
FIG. 10 illustrates an example simplified procedure for associating content data with a content group.

FIG. 10 illustrates an example simplified procedure 1000 for associating content data with a content group. Generally, procedure 1000 may be performed by a specialized device, such as device 200, executing machine instructions that can be implemented as software and/or hardware. Procedure 1000 starts at step 1005 and continues on to step 1010 where, as described in greater detail above, the device may apply one or more classifiers to Internet content data, to identify a plurality of content classes for the content data. In various embodiments, each of the content class also has a corresponding classification score based on the classification. For example, such a score may indicate that the content data belongs to a given class with a certain degree of confidence/reliability.

At step 1015, as detailed above, the device may determine whether any of the identified classes in step 1010 are above a threshold level. For example, the device may test whether the class with the highest classification score is above a certain threshold degree of confidence/reliability. If so, in some embodiments, the device may simply assign this class to the content data as its finalized content class.

At step 1020, the device may identify one or more content groups associated with the content classes identified in step 1010, as described in greater detail above. In particular, a content group may be a collection of classes that is itself a class that generally applies across all of its constituent classes. For example, the "Commerce" content group may apply to, and include, classes "Financial Services," "Restaurants," Vehicles," etc.

At step 1025, as detailed above, the device may associate a selected content group from the identified content groups with the content data. In various embodiments, the device may do so based on a determination that the classification scores for the plurality of content classes do not exceed the threshold level. In particular, if none of the classification scores for the classes identified in step 1010 exceed a threshold level, as assessed in step 1015, the device may instead associate the content data with one of the corresponding content groups that includes at least some of the identified classes from the classification. In some embodiments, the device may select the content group based on an analysis of the top n-number of classes (e.g., if a majority of the top classes all belong to the same content group). In other embodiments, the device may calculate combined scores for each of the content groups based on the scores of their constituent classes. Procedure 1000 then ends at step 1030.

It should be noted that while certain steps within procedure 1000 may be optional as described above, the steps shown in FIG. 10 are merely examples for purposes of illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the flexible classification of Internet content that improves the reliability of the output classes. In some aspects, if the system deems that none of the classes from the classifier(s) are reliable enough, the system may instead attempt to apply a more generic class (e.g., a content group) to the content data. Doing so ensures that any security service that leverages the final classification of the content has the most reliable class to assess.

As will be appreciated, the above examples are intended only for the understanding of certain aspects of the techniques herein and are not limiting in nature. While the techniques are described primarily with respect to a particular device or system, the disclosed processes may be executed by other devices according to further implementations. For example, while the techniques herein are described primarily with respect to a two-tiered classification hierarchy with the classifier outputs/classes on one tier and content groups on a higher tier, other embodiments provide for the use of any number of tiers, to provide for more general or granular classifications, as desired.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed:

1. A method comprising:
   classifying, by a device in a network, Internet content data using one or more classifiers to identify a plurality of content classes for the content data, wherein each content class has a corresponding classification score based on the classification;
   determining, by the device, whether any of the classification scores exceeds a threshold level, comprising:
      identifying, by the device, a content class with a highest classification score among the classification scores; and
      comparing, by the device, the highest classification score to the threshold level;
   identifying, by the device, a set of content groups, wherein each of the plurality of content classes is associated with one of the content groups;
   assigning, by the device, the content class with the highest classification score to the content data when the highest classification score exceeds the threshold level;
   combining, by the device, the classification scores of the content classes by associated content groups to determine a combined score for each of the associated content groups when the highest classification score fails to exceed the threshold level; and
   enforcing a security policy or user policy based at least in part on the assigning or the combining.

2. The method as in claim 1, further comprising:
   providing, by the device, an indication of the content group associated with the content data to an Internet security service.

3. The method as in claim 1, further comprising:
   associating the content data with a particular content group, wherein associating the content data with the particular content group comprises:
   selecting, by the device, a first subset of the plurality of content classes based on their classification scores; and
   determining, by the device, whether the particular content group is associated with a majority of the content classes in the first subset.

4. The method as in claim 3, further comprising:
   selecting, by the device, a second subset of the plurality of content classes based on their classification scores, wherein the second subset is larger than the first subset; and
   determining, by the device, whether the particular content group is associated with a majority of the content classes in the second subset.

5. The method as in claim 1, further comprising:
   determining, by the device, that a second set of Internet content data cannot be classified.

6. The method as in claim 1, wherein associating the content data with the particular content group comprises:
   identifying a content group with a highest combined score;
   determining, by the device, whether the highest classification score for the identified content group exceeds a combined score threshold.

7. The method as in claim 6, further comprising:
   assigning the content group with the highest combined score to the content data, based at least in part on determining that the content group with the highest combined score satisfies the combined score threshold.

8. The method as in claim 1, further comprising:
   training, by the device, the one or more classifiers using a training dataset.

9. An apparatus, comprising:
one or more network interfaces to communicate with a network;
a processor coupled to the network interfaces and configured to execute one or more processes; and
a memory configured to store a process executable by the processor, the process when executed operable to:
classify Internet content data using one or more classifiers to identify a plurality of content classes for the content data, wherein each content class has a corresponding classification score based on the classification;
determine whether any of the classification scores exceeds a threshold level, comprising:
identifying, by the device, a content class with a highest classification score among the classification scores; and
comparing, by the device, the highest classification score to the threshold level;
identify a set of content groups, wherein each of the plurality of content classes is associated with one of the content groups;
assign the content class with the highest classification score to the content data when the highest classification score exceeds the threshold level;
combine the classification scores of the content classes by associated content groups to determine a combined score for each of the associated content groups when the highest classification score fails to exceed the threshold level; and
enforce a security policy or user policy based at least in part on the assigning or the combining.

10. The apparatus as in claim 9, wherein the process when executed is further operable to:
provide an indication of the content group associated with the content data to an Internet security service.

11. The apparatus as in claim 9, wherein the process when executed is further operable to:
associate the content data with a particular content group, wherein the apparatus associates the content data with the particular content group by:
selecting a first subset of the plurality of content classes based on their classification scores; and
determining whether the particular content groups is associated with a majority of the content classes in the first subset.

12. The apparatus as in claim 11, wherein the process when executed is further operable to:
select a second subset of the plurality of content classes based on their classification scores, wherein the second subset is larger than the first subset; and
determine whether the particular content group is associated with a majority of the content classes in the second subset.

13. The apparatus as in claim 9, wherein the process when executed is further operable to:
determine that a second set of Internet content data cannot be classified.

14. The apparatus as in claim 9, wherein the apparatus associates the content data with the particular content group by:
identifying a content group with a highest combined score;
determining whether the highest classification score for the identified content group exceeds a combined score threshold.

15. The apparatus as in claim 14, wherein the process when executed is further operable to;
determine that the highest classification score exceeds a threshold level; and
assign the content group with the highest combined score to the content data based at least in part on the determining.

16. The apparatus as in claim 9, wherein the process when executed is further operable to:
train one or more classifiers using a training dataset.

17. A tangible, non-transitory, computer-readable media having software encoded thereon that causes a device in a network to execute a process comprising:
classifying Internet content data using one or more classifiers to identify a plurality of content classes for the content data, wherein each content class has a corresponding classification score based on the classification;
determining whether any of the classification scores exceeds a threshold level, comprising:
identifying, by the device, a content class with a highest classification score among the classification scores; and
comparing, by the device, the highest classification score to the threshold level;
identifying a set of content groups, wherein each of the plurality of content classes is associated with one of the content groups;
assigning the content class with the highest classification score to the content data when the highest classification score exceeds the threshold level;
combining, by the device, the classification scores of the content classes by associated content groups to determine a combined score for each of the associated content groups when the highest classification score fails to exceed the threshold level; and
enforcing a security policy or user policy based at least in part on the assigning or combining.

18. The tangible, non-transitory, computer readable media as in claim 17, wherein the process further comprises:
providing an indication of the content group associated with the content data to an Internet security service.

19. The method as in claim 6, further comprising:
refraining from assigning any content group or any content class to the content group based at least in part on determining that the content group with the highest combined score does not satisfy the combined score threshold.

20. The method as in claim 1, wherein the security or user protocol comprises at least one of:
employing a blocking procedure for the content data, refraining from forwarding a webpage request to a server, identifying a reputation score for a server that indicates a risk of malware, or any combination thereof.

* * * * *